(12) United States Patent
LeMaster et al.

(10) Patent No.: US 9,857,226 B2
(45) Date of Patent: Jan. 2, 2018

(54) MICROGRID ARRANGEMENT FOR INTEGRATED IMAGING POLARIMETERS

(71) Applicant: The United States of America, as represented by the Secretary of the Air Force, Washington, DC (US)

(72) Inventors: Daniel A. LeMaster, Dayton, OH (US); Keigo Hirakawa, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/619,058

(22) Filed: Feb. 10, 2015

(65) Prior Publication Data

US 2016/0231177 A1 Aug. 11, 2016

(51) Int. Cl.
*G01J 4/00* (2006.01)
*G01J 4/04* (2006.01)
*G02B 5/30* (2006.01)

(52) U.S. Cl.
CPC .............. *G01J 4/04* (2013.01); *G02B 5/3058* (2013.01)

(58) Field of Classification Search
CPC ...... G01N 21/21; G01N 21/211; G01N 21/23; G01J 4/04; G01J 4/00
USPC ......................................................... 356/364
See application file for complete search history.

(56) References Cited

U.S. PATENT DOCUMENTS

| 6,269,565 | B1* | 8/2001 | Inbar | G02B 27/024 345/87 |
| 6,563,582 | B1* | 5/2003 | Chun | G02B 5/1814 250/332 |
| 2003/0103214 | A1* | 6/2003 | VanDelden | G01J 4/04 356/491 |
| 2009/0021598 | A1* | 1/2009 | McLean | G01J 3/02 348/222.1 |
| 2012/0075513 | A1* | 3/2012 | Chipman | G01J 4/04 348/302 |
| 2012/0242959 | A1* | 9/2012 | Huang | G02B 27/0994 353/20 |

OTHER PUBLICATIONS

Lacasse, Maximum Bandwidth Snapshot Channeled Imaging Polarimeter with Polarization Grating,, Proc. of SPIE vol. 9853, 2016.
Alenin, Optimal Bandwidth Micropoloarizer Arrays, Optics Letters, 2016.

* cited by examiner

*Primary Examiner* — Tarifur Chowdhury
*Assistant Examiner* — Md M Rahman
(74) *Attorney, Agent, or Firm* — AFMCLO/JAZ; Jason Sopko

(57) ABSTRACT

An integrated microgrid imaging polarimeter comprises a repeating pattern of wiregrid polarizers in a new 2×4 array that improves image resolution and quality by increasing the spatial bandwidth available for each Stokes image despite that the new repeating pattern is larger than prior art 2×2 arrays. An example embodiment has polarization orientations of the wiregrid polarizers in each 2×4 array, beginning from an arbitrary top left polarizer of each array and continuing clockwise, as: 45 degrees; zero degrees; 315 degrees; 90 degrees; zero degrees; 45 degrees; 90 degrees; and, 315 degrees. The disclosure includes an analysis showing development of the new 2×4 array and supporting its improved performance over prior art 2×2 arrays.

7 Claims, 4 Drawing Sheets

2 x 2

2 x 4

2 x 2

2 x 4

MICROGRID ARRANGEMENT FOR INTEGRATED IMAGING POLARIMETERS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to wiregrid polarizers, and more specifically to a new array pattern of individual wiregrids for use in imaging polarimeters.

Remote sensing applications can make use of the optical polarization characteristics of a scene to enhance target detection and discrimination. Imaging polarimeters utilize polarizing arrays positioned in front of a focal plane array of detector pixels to extract polarization information from the optical scene.

An integrated microgrid imaging polarimeter includes a repeating pattern of wiregrid polarizers bonded to a focal plane array. A wiregrid polarizer can be made as a layer of very thin ruled aluminum wires sandwiched between two glass windows. The most common microgrid arrangement is a 2×2 repeating pattern of so-called analyzer cells. A typical 2×2 array is shown in FIG. 1. The lines in each cell correspond to the wiregrid element orientation. This specific pattern has been the standard since 1994.

Raw microgrid data are used to infer Stokes parameter images. The power spectrum of a raw microgrid image consists of a high bandwidth unmodulated $S_0$ image spectrum surrounded by the low bandwidth spectra of $S_1$ and $S_2$. The $S_1$ and $S_2$ spectra are modulated out to the Nyquist frequency in the direction of the principal axes of the array. The connection between this Fourier analysis of modulated polarimeters as linear systems and the more widely known data reduction matrix was shown in 2012. The microgrid spectrum is similar to Color Filter Arrays (CFAs) used to extract color information for digital cameras, where a mosaic of tiny color filters are placed over the pixel sensors of an image sensor to capture color information, in that the high bandwidth spectrum centered at a DC-centered array corresponds to the luminance image and the low bandwidth modulated portions of the spectra correspond to chrominance.

Despite the long-term use of the standard 2×2 array and its pattern of different polarization directions, there is still a need for greater resolution and image quality.

SUMMARY OF THE INVENTION

To address this challenge, the teachings of the present invention provide a new 2×4 arrangement, or array, of individual wiregrid polarizers that minimizes the risk of aliasing between the Stokes vector images, providing maximum image bandwidth and, therefore, better resolution and image quality than prior art 2×2 arrays.

This new pattern improves image resolution and quality by increasing the spatial bandwidth available for each Stokes image despite that the new repeating pattern is larger than the standard prior art 2×2 design.

The polarization orientations of the wiregrid polarizers in each 2×4 array may, beginning from an arbitrary top left wiregrid polarizer of each array and continuing clockwise, be: 45 degrees; zero degrees; 315 degrees; 90 degrees; zero degrees; 45 degrees; 90 degrees; and, 315 degrees.

BRIEF DESCRIPTION OF THE DRAWINGS

The teachings of the present invention will be better understood from the accompanying drawings illustrating various aspects and example embodiments of the invention and its teachings.

DETAILED DESCRIPTION

Additional details of the teachings of the present invention are in D. LeMaster and K. Hirakawa, "Improved Microgrid Arrangement for Integrated Imaging Polarimeters," *Opt. Lett.* 39, 1811-1814 (2014), the contents of which are incorporated by reference into this description.

The resolution of traditional, microgrid imaging polarimetric imagers suffers from that, to form an image, the imager, or camera, must combine information from multiple pixels, each sensing a different state of polarization, into a single unpolarized image. Or, the camera forms an image from a single polarization orientation, ignoring information from pixels sensing other polarization states. Either way, the camera cannot form an image having the quality one would expect from a camera possessing a similar number of unpolarized pixels. The present invention, however, provides a new pattern of wiregrid polarizers and a corresponding mathematical interpretation of the signals from the polarized pixels that can yield better image quality than conventional, state of the art, 2×2 polarizer arrays and their associated mathematical interpretation. This major advance over the state of the art thus addresses a key issue, enhancing the quality of images from polarimetric imagers without increasing the number of available pixels.

Figure 1:
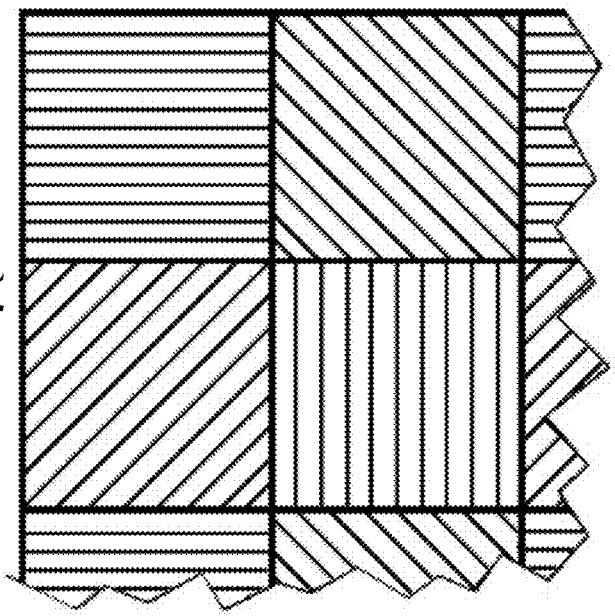
FIG. 1 shows a conventional prior art 2×2 microgrid array of analyzer cells.
Figure 2:
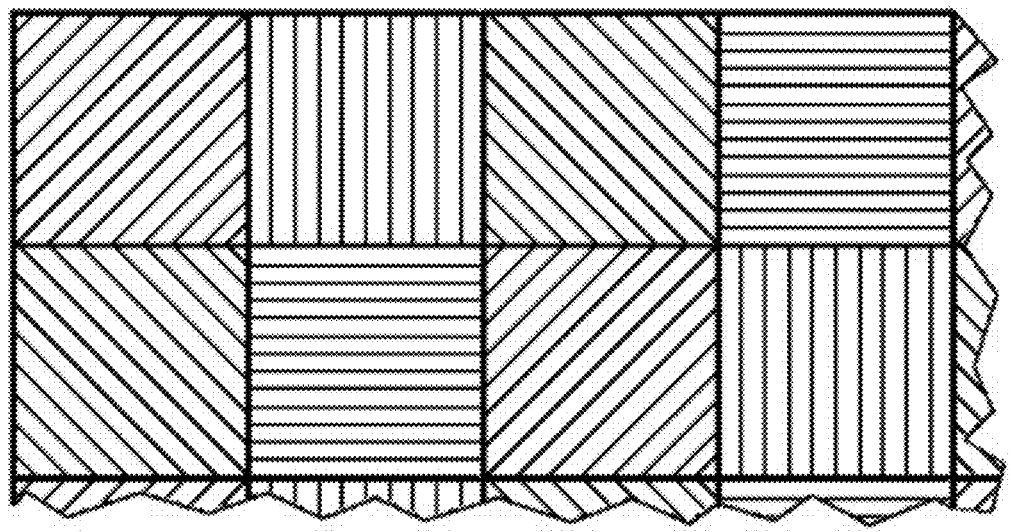
FIG. 2 shows a 2×4 microgrid array of analyzer cells according to the teachings of the present invention, showing an example embodiment of differing polarization orientations.

As described in the Background of the Invention, Color Filter Arrays are designed to improve spatial resolution by optimizing the separation between the luminance and chrominance spectra. The present invention draws on this approach to develop the new microgrid array pattern shown in FIG. 2. This new pattern improves image quality by increasing the spatial bandwidth available for each Stokes image despite that the new repeating pattern is larger than the original 1994 2×2 design. This new pattern retains the noise performance optimality of the original pattern in terms of conditioning of the data reduction matrix.

The Stokes parameters=$(S_0, S_1, S_2)^T \in \mathbb{R}^3$ follow a standard convention to describe linear polarization states in terms of radiometric quantities. The $S_0$ image contains grayscale spatial information about the scene. Images $S_1$ and $S_2$ together express the extent and orientation of linear polarization in the scene. The radiation recorded by each detector in a microgrid array $X \in \mathbb{R}^+$ is related to the Stokes parameters S of the incoming light by the equation:

$$X = \underbrace{\left[ \frac{1}{2} \quad D\cos(2\theta) \quad D\sin(2\theta) \right]}_{A_\theta} S \qquad \text{Eq. (1)}$$

where, without loss of generality, the neutral density transmission losses in the analyzer are normalized out and $D \in [0,1]$ is the diattenuation of the analyzer. Note that Stokes parameter $S_3$ is not treated in this analysis because the microgrid arrays of interest are not sensitive to it.

For imaging, the Stokes parameters refer to a function S: $\mathbb{Z}^2 \to \mathbb{R}^3$, where $S(\eta)$ is the Stokes parameter for the light arriving at the pixel location $n=(\eta_1, \eta_2)^T \in \mathbb{Z}^2$. For imaging with a microgrid polarizer array (MPA), an array of wiregrid polarizers is placed over an entire detector array, generally comprising a mosaic of corresponding detector pixels. As such, the pixel detector at location $\eta$ makes exactly one measurement $X(\eta)$ ($X: \mathbb{Z}^2 \to \mathbb{R}^+$) along one microgrid polarizer orientation $\theta(\eta)$ ($\theta: \mathbb{Z}^2 \to \mathbb{R}/2\pi$), as follows:

$$X(n) = A_{\theta(n)}S(n) \quad \text{Eq. (2)}$$
$$= S_0(n) + D\cos(2\theta(n))S_1(n) + D\sin(2\theta(n))S_2(n)$$

A finite number of polarizer orientations $\theta \in \{\theta_1, \ldots, \theta_K\}$ are used in a microgrid polarizer array. The perspective adopted by the prior work on MPAs is that $X(\eta)$ is a spatial multiplexing of $A_{\theta_K}S(\eta)$. For example, the 2×2 repeating MPA pattern takes the following form:

$$X(n) = \begin{cases} A_0(n)S(n) & n_1 \text{ and } n_2 \text{ even} \\ A_{\pi/4}(n)S(n) & n_1 \text{ even; } n_2 \text{ odd} \\ A_{\pi/2}(n)S(n) & n_1 \text{ and } n_2 \text{ odd} \\ A_{3\pi/4}(n)S(n) & n_1 \text{ odd; } n_2 \text{ even} \end{cases} \quad \text{Eq. (3)}$$
$$= S_0(n) + \left(\frac{D}{2}\right)(-1)^{n_1}(S_1(n) + S_2(n)) + \left(\frac{D}{2}\right)(-1)^{n_2}(S_1(n) - S_2(n))$$

Let $\hat{\cdot}$ denote discrete space Fourier transform, where $\hat{S}_0(\omega): \{\mathbb{R}/2\pi\}^2 \to \mathbb{C}$ refers to the Fourier transform of $S_0$ at the two dimensional spatial frequency $\omega=(\omega_1, \omega_2)^T \in \{\mathbb{R}/2\pi\}^2$, etc. The Fourier analysis of Eq. (3) is:

$$\hat{X}(\omega) = \quad \text{Eq. (4)}$$
$$\hat{S}_0(\omega) + \left(\frac{D}{2}\right)\{\hat{S}_1 + \hat{S}_2\}\left(\omega - \begin{pmatrix} \pi \\ 0 \end{pmatrix}\right) + \left(\frac{D}{2}\right)\{\hat{S}_1 - \hat{S}_2\}\left(\omega - \begin{pmatrix} 0 \\ \pi \end{pmatrix}\right).$$

This type of Fourier analysis is by now standard in the related field of color filter array (CFA) imaging. By Eq. (4), one can reinterpret Eq. (3) also as a spatial frequency multiplexing where modulation by $$\omega \in \left\{ \begin{pmatrix} \pi \\ 0 \end{pmatrix}, \begin{pmatrix} 0 \\ \pi \end{pmatrix} \right\}$$

separates $\hat{S}_1 + \hat{S}_2$ from $\hat{S}_0$, respectively. The sampling $S \to X$ is said to be aliased with $$\{\hat{S}_1 + \hat{S}_2\}\left(\omega - \begin{pmatrix} 0 \\ \pi \end{pmatrix}\right)$$

and/or $$\{\hat{S}_1 - \hat{S}_2\}\left(\omega - \begin{pmatrix} 0 \\ \pi \end{pmatrix}\right).$$

One can use standard amplitude demodulation to reconstruct $S_0$, $S_1$, and $S_2$ from X provided they are not aliased.

Figure 3:
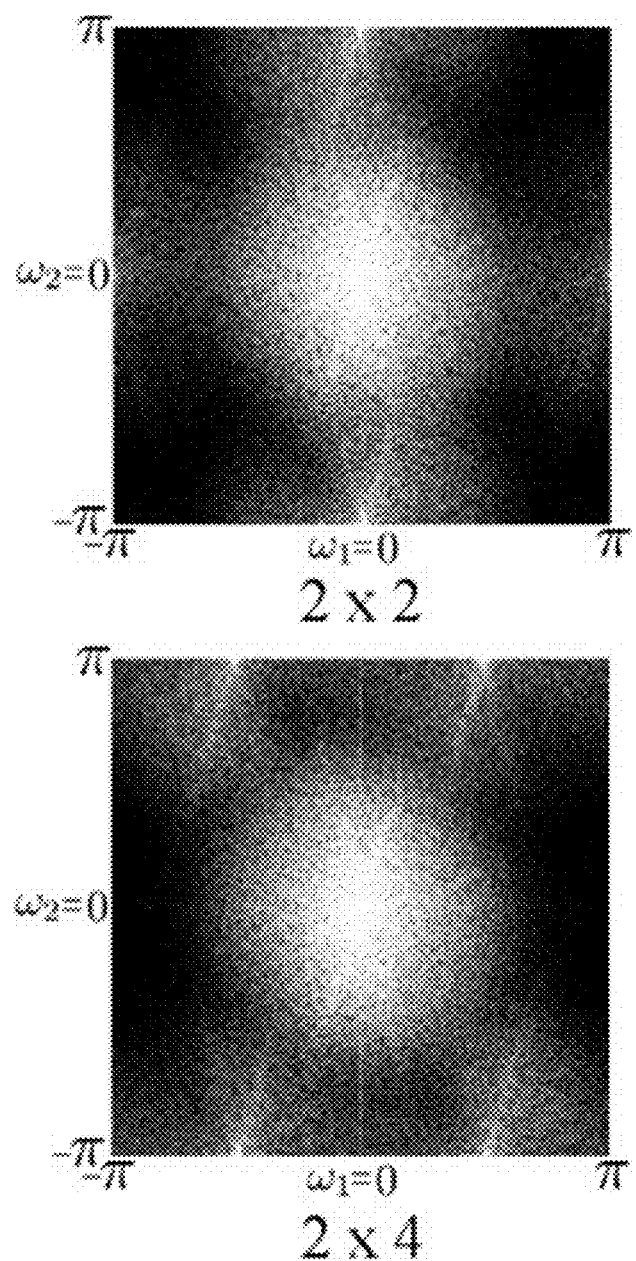
FIG. 3 is a log-scale spectra of microgrid polarizer array (MPA) sampled sensor data from a 2×4 microgrid array made according to the teachings of the present invention.

The Fourier support of $\hat{X}$ is shown in the top of FIG. 3. The modulation of Eq. (4) is evidenced by the concentration of energy near $$\omega = \left\{ \begin{pmatrix} 0 \\ 0 \end{pmatrix} \begin{pmatrix} \pi \\ 0 \end{pmatrix}, \begin{pmatrix} 0 \\ \pi \end{pmatrix} \right\}.$$

This figure is useful for assessing the risk of aliasing by the modulation frequency. For example, if the bandwidth of $\hat{S}_1(\omega)$ is $\lambda$ (i.e., $\hat{S}_1(\omega)=0 \; \forall \|\omega\| > \lambda$), then $\hat{S}_0(\omega)$ must be zero $\forall \|\omega\| > \pi - \lambda$ in order to avoid aliasing (a requirement for recovering S from X). It is clear that there is a high risk of aliasing for a 2×2 repeating MPA pattern.

Drawing from the optimal CFA design approach described earlier, consider an alternative to the 2×2 repeating MPA pattern. Assume $\theta: \mathbb{Z}^2 \to \mathbb{R}/2\pi$ is linear with respect to $\eta$:

$$\theta(n) = \frac{1}{2}\omega_0^T n \quad \text{Eq. (5)}$$

where $\omega_0 \in \mathbb{R}^2$. Letting $Y: \mathbb{Z}^2 \to \mathbb{R}^+$ denote sensor response to this new MPA, $\cos(2\theta(\eta))$ and $\sin(2\theta(\eta))$ in Y become sinusoidal modulators:

$$Y(n) = A_{\theta(n)}S(n) \quad \text{Eq. (6)}$$
$$= S_0(n) + D\cos(\omega_0^T n)S_1(n) + D\sin(\omega_0^T n)S_2(n).$$

This gives rise to a straightforward Fourier analysis $\hat{Y}$ of Y:

$$\hat{Y}(\omega) = \hat{S}_0(\omega) + \left(\frac{D}{2}\right)\{\hat{S}_1 - j\hat{S}_2\}(\omega - \omega_0) + \left(\frac{D}{2}\right)\{\hat{S}_1 + j\hat{S}_2\}(\omega + \omega_0) \quad \text{Eq. (7)}$$

where $j=\sqrt{-1}$). Contrasting Eqs. (3) and (4) with Eqs. (6) and (7), respectively, the main difference is that the latter undergoes a spatial frequency modulation by $\omega_0 \in \{\mathbb{R}/2\pi\}^2$. This is evident in the example Fourier support of $\hat{Y}$ shown at the bottom in FIG. 3, where $$\omega_0 = \begin{pmatrix} \pi/2 \\ \pi \end{pmatrix}$$

and the energy is concentrated near $\omega_0$ $$\in \left\{ \begin{pmatrix} 0 \\ 0 \end{pmatrix}, \begin{pmatrix} \pm\pi/2 \\ \pi \end{pmatrix} \right\}.$$

Clearly, the advantage of $\hat{Y}$ in Eq. (7) over Eq. (4) is that the risk of aliasing has significantly reduced because the modulated components of the spectrum are more spread out.

The main conclusion from this analysis is that the modulation frequency $\omega_0 \in \{\mathbb{R}/2\pi\}^2$ is a design parameter for MPA patterns which should be chosen to minimize the risk of aliasing. Obviously, choosing $\|\omega\|$ to be as large as possible would avoid aliasing between $\hat{S}_0(\omega)$ and $\{\hat{S}_1 - j\hat{S}_2\}(\omega - \omega_0)$. But one must also consider the risks of aliasing contaminations between $\{\hat{S}_1 - j\hat{S}_2\}(\omega - \omega_0)$ and $\{\hat{S}_1 - j\hat{S}_2\}$ ($\omega+\omega_0$) which may occur if $\omega_0$ and $-\omega_0$ are close. Therefore, relative bandwidths of $\hat{S}_0$, $\hat{S}_1$, $\hat{S}_2$ must be simultaneously considered.

Performance in the presence of noise is unaffected by the new array pattern. For proof, first consider a band-limited unaliased signal measured with the conventional 2×2 MPA. Demodulation of X yields:

$$S_0(\eta) = H_0(\eta) * X(\eta) \qquad \text{Eq. (8)}$$

$$(D/2)\{S_1(\eta)+S_2(\eta)\} = H_1(\eta) * \{e^{-j(0,\pi)\eta} X(\eta)\} \qquad \text{Eq. (9)}$$

$$(D/2)\{S_1(\eta)-S_2(\eta)\} = H_1(\eta) * \{e^{-j(\pi,0)\eta} X(\eta)\} \qquad \text{Eq. (10)}$$

where * denotes convolution, and $H_0$ ($H_1$) are low pass filters designed to match the support of $S_0$ ($S_1$ and $S_2$). The Fourier domain equivalent of this process is:

$$\hat{S}_0(\omega) = \hat{H}_0(\omega)\hat{X}(\omega) \qquad \text{Eq. (11)}$$

$$(D/2)\{\hat{S}_1(\omega)+\hat{S}_2(\omega)\} = \hat{H}_1(\omega)\hat{X}(\omega-(_\pi^0)) \qquad \text{Eq. (12)}$$

$$(D/2)\{\hat{S}_1(\omega)-\hat{S}_2(\omega)\} = \hat{H}_1(\omega)\hat{X}(\omega-(_0^\pi)) \qquad \text{Eq. (13)}$$

which allows for the Stokes image spectra to be recovered via:

$$\begin{pmatrix} \hat{S}_0 \\ \hat{S}_1 \\ \hat{S}_2 \end{pmatrix} = \begin{pmatrix} 1 & 0 & 0 \\ 0 & \frac{1}{D} & \frac{1}{D} \\ 0 & \frac{1}{D} & \frac{-1}{D} \end{pmatrix} \begin{pmatrix} \hat{S}_0 \\ \frac{D}{2}(\hat{S}_1+\hat{S}_2) \\ \frac{D}{2}(\hat{S}_1-\hat{S}_2) \end{pmatrix} \qquad \text{Eq. (14)}$$

Under the same conditions, the 2×4 MPA yields:

$$S_0(\eta) = H_0(\eta) * X(\eta) \qquad \text{Eq. (15)}$$

$$(D/2)\{S_1(\eta)+jS_2(\eta)\} = H_1(\eta) * \{e^{-j\omega T_0 \eta} X(\eta)\} \qquad \text{Eq. (16)}$$

$$(D/2)\{S_1(\eta)-jS_2(\eta)\} = H_1(\eta) * \{e^{j\omega T_0 \eta} X(\eta)\} \qquad \text{Eq. (17)}$$

and the Stokes spectra are recovered from:

$$\begin{pmatrix} \hat{S}_0 \\ \hat{S}_1 \\ \hat{S}_2 \end{pmatrix} = \begin{pmatrix} 1 & 0 & 0 \\ 0 & \frac{1}{D} & \frac{1}{D} \\ 0 & \frac{-j}{D} & \frac{j}{D} \end{pmatrix} \begin{pmatrix} \hat{S}_0 \\ \frac{D}{2}(\hat{S}_1+j\hat{S}_2) \\ \frac{D}{2}(\hat{S}_1-j\hat{S}_2) \end{pmatrix} \qquad \text{Eq. (14)}$$

In both Eqs. (14) and (18), the matrices that recover the Stokes spectra from the demodulation products have the same condition number, for example, for D=1 the condition number of each is $$\frac{1}{\sqrt{2}}.$$

Both MPA are equally conditioned and therefore expected to provide equivalent performance in the presence of noise.

Synthetic imagery is used to demonstrate the wider unaliased bandwidth and thus superior image quality of a 2×4 array. Raw microgrid data of each array type are generated from Stokes imagery of a static scene originally collected with a visible Rotating Analyzer (RA) imaging polarimeter. Before microgrid resampling, the total bandwidth of each RA Stokes images was limited using an 11×11 pixel Gaussian filter with a 0.5 pixel standard deviation. The log-scale spectra of the synthetic MPA images in FIG. 3 show that the 2×4 array reduces the risk of aliasing by further separating out the various polarimetric image components. The conversion from Stokes to raw microgrid data is accomplished by Eq. (6). The modeled microgrid analyzers have unity diattenuation. For both the 2×2 and 2×4 cases, all Gaussian reconstruction filters have a support of 41×41 pixels and a standard deviation of 1 pixel.

More importantly, this difference in array arrangement is manifest in the reconstructed $S_0$ and Degree of Linear Polarization (DOLP) images. DOLP, $P(\eta)$ ($P: \mathbb{Z}^2 \to \mathbb{R}^+$) is recoverable from the Stokes images by the relation:

$$P(n) = \frac{\sqrt{S_1^2(n)+S_2^2(n)}}{S_0(n)} \qquad \text{Eq. (19)}$$

Physically, DOLP is a measure of the extent of polarization inferred for each pixel in the scene. Aliasing in microgrid imagery is readily observable as false DOLP signals.

Figure 4:
FIG. 4 compares a pair of reconstructed $S_0$ images for prior art 2×2 microgrid arrays and for 2×4 microgrid arrays made according to the teachings of the present invention.
Figure 4:
Figure 5:
FIG. 5 compares a pair of reconstructed Degree of Linear Polarization (DOLP) images for prior art 2×2 microgrid arrays and for 2×4 microgrid arrays made according to the teachings of the present invention.
Figure 5:
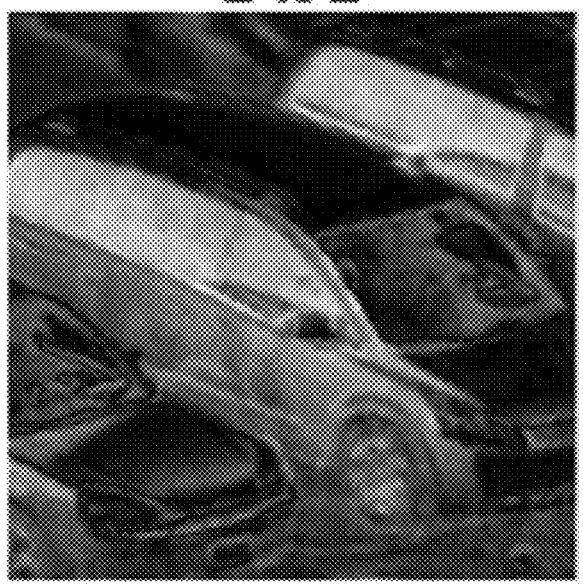

The reconstructed $S_0$ and DOLP images for each array configuration are shown in FIGS. 4 and 5, respectively. The 2×2 array results are clearly more aliased than their 2×4 counterparts, but the difference is especially noticeable throughout the DOLP images. Fidelity to the original Stokes images can also be quantified using root mean squared error (RMSE). Table I shows that RMSE is lower in the images reconstructed from the 2×4 MPA in every case.

TABLE I

Root Mean Square Error Comparison (units of digital counts) Between True Image and Reconstructed Images

| Image | 2 × 4 | 2 × 2 |
|---|---|---|
| $S_0$ | 7.02 | 15.47 |
| $S_1$ | 6.27 | 8.77 |
| $S_2$ | 7.54 | 9.78 |

The polarimetric sampling arrangement of the present invention represents the first major improvement in spatial resolution for microgrid-integrated imaging polarimeters in almost 20 years. This improved array widens the unaliased bandwidth available for image reconstruction by increasing the separation between the spatially modulated Stokes components of the microgrid spectra. This outcome is achieved without affecting performance in the presence of noise.

The relationship between components of the microgrid spectra is a consequence of the periodic sampling array and independent of detector size. Consequently, this refined microgrid pattern will be useful even as technology to produce smaller detectors and microgrids continues to improve. A 2×4 pattern made according to the teachings of the present invention has multiple other equally valid polarization orientation patterns and their transposes which can be similarly successfully used for other imaging applications.

Those having skill in the art of the invention will readily recognize that terms used in this description and in the claims have their ordinary meanings as understood in the imaging art. For example, the term "focal plane" refers to the plane at which an optical image is focused for purposes of detecting that image along that plane using detector cells or pixels.

Similarly, those having skill in the art of the invention will recognize that, analogous to as described in connection with Color Filter Arrays, each 2×4 array comprises eight individual wiregrid polarizers, each individual wiregrid polarizer having a polarization orientation in a specific direction. A microgrid imaging polarimeter, or an imaging microgrid polarimeter, comprises a plurality of such 2×4 arrays of individual wiregrid polarizers.

Those having skill in the art of the invention will similarly recognize that the equations supporting the new 2×4 array are based on the wiregrid polarizers being proximate to the focal plane and detector cells along the focal plane.

Various modifications to the invention as described may be made, as might occur to one with skill in the art of the invention, within the scope of the claims. Therefore, not all contemplated example embodiments have been shown in complete detail. Other embodiments may be developed without departing from the spirit of the invention or from the scope of the claims.

We claim:

1. A microgrid imaging polarimeter, comprising a plurality of 2×4 identical arrays of eight wiregrid polarizers proximate to a focal plane, where each of the eight wiregrid polarizers comprises one of four different polarization orientations, where each of the four different polarization orientations is used by exactly two different wiregrid polarizers in each of the arrays, and each of the arrays represents a smallest periodic repeating, pattern of wiregrid polarizers in the microgrid imaging polarimeter, thereby widening an unaliased bandwidth available for image reconstruction by increasing a separation between spatially modulated Stokes components of the microgrid spectra, without affecting performance in a presence of noise.

2. The microgrid imaging polarimeter according to claim 1, wherein each wiregrid polarizer corresponds to a corresponding detector pixel in the focal plane.

3. The microgrid imaging polarimeter of claim 1, wherein the polarization orientations of the wiregrid polarizers in each 2×4 array, beginning from an arbitrary top left wiregrid polarizer of each array and continuing clockwise, are: 45 degrees; zero degrees; 315 degrees; 90 degrees; zero degrees; 45 degrees; 90 degrees; and, 315 degrees.

4. A microgrid imaging polarimeter, comprising:
(a) a plurality of identical 2×4 arrays of eight wiregrid polarizers, where each of the eight wiregrid polarizers comprises one of four different polarization orientations, where each of the eight wiregrid polarizers comprises one of four different polarization orientations, where each of the four different polarization orientations is used by exactly two different wiregrid polarizers in each of the arrays, and each of the arrays represents a smallest periodic repeating pattern of wiregrid polarizers in the microgrid imaging polarimeter, thereby widening an unaliased bandwidth available for image reconstruction by increasing a separation between spatially modulated Stokes components of the microgrid spectra, without affecting performance in a presence of noise;
(b) a plurality of detector pixels; and,
(c) wherein each wiregrid polarizer is proximate to a corresponding detector pixel.

5. The microgrid imaging polarimeter according to claim 4, wherein the polarization orientations of the wiregrid polarizers in each 2×4 array, beginning from an arbitrary top left wiregrid polarizer of each array and continuing clockwise, are: 45 degrees; zero degrees; 315 degrees; 90 degrees; zero degrees; 45 degrees; 90 degrees; and, 315 degrees.

6. A method for making a polarized image, comprising the steps of:
(a) providing an imaging polarimeter, including:
a plurality of identical 2×4 arrays of eight wiregrid polarizers proximate to a focal plane, where each of the eight wiregrid polarizers comprises one of four different polarization orientations, where each of the four different polarization orientations is used by exactly two different wiregrid polarizers in each of the arrays, and each of the arrays represents a smallest periodic repeating pattern of wiregrid polarizers in the microgrid imaging polarimeter, thereby widening are unaliased bandwidth available for image reconstruction by increasing a separation between spatially modulated Stokes components of the microgrid spectra, without affecting performance in a presence of noise;
(ii) a plurality of detector pixels; and,
(iii) wherein each wiregrid polarizer is proximate to a corresponding detector pixel.

7. The method for making a polarized image according to claim 6, wherein the polarization orientations of the wiregrid polarizers in each 2×4 array, beginning from an arbitrary top left wiregrid polarizer of each array and continuing clockwise, are: 45 degrees; zero degrees; 315 degrees; 90 degrees; zero degrees; 45 degrees; 90 degrees; and, 315 degrees.

* * * * *